Oct. 26, 1965     W. D. MACGEORGE     3,213,670
MEASURING APPARATUS
Filed Feb. 21, 1963     2 Sheets-Sheet 1
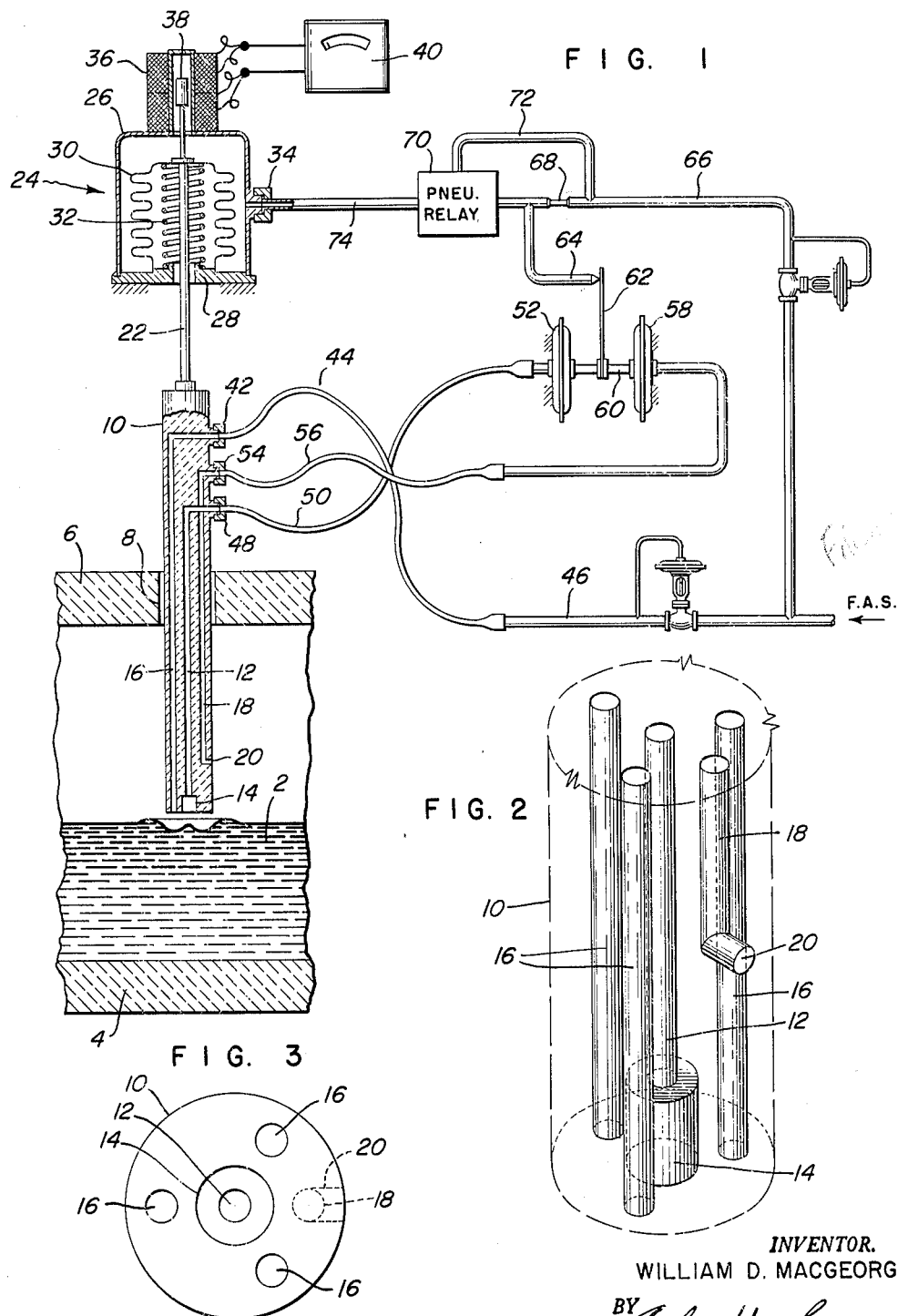
INVENTOR.
WILLIAM D. MACGEORGE
BY Arthur H. Swanson
ATTORNEY.

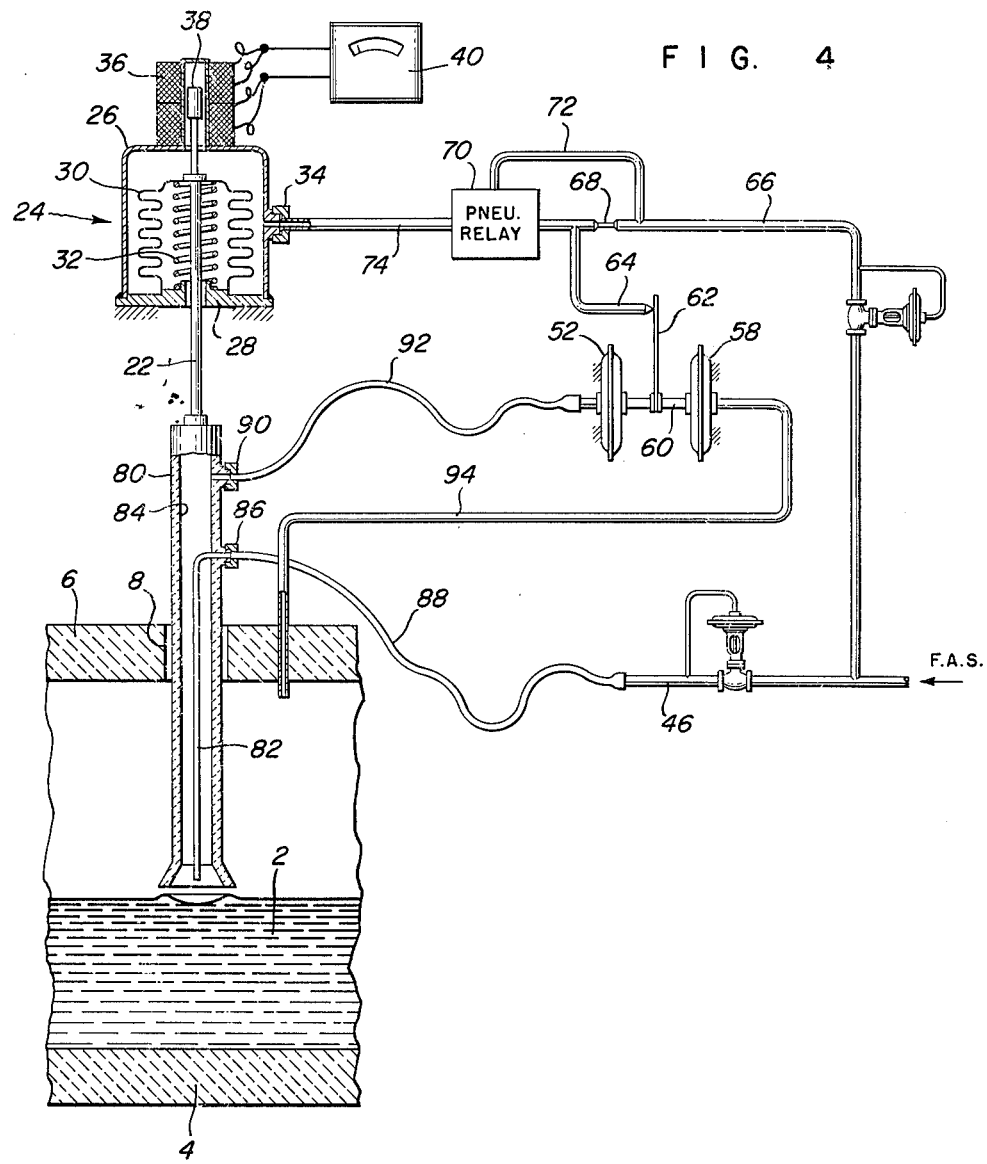

United States Patent Office 3,213,670
Patented Oct. 26, 1965

3,213,670
MEASURING APPARATUS
William D. Macgeorge, Huntingdon Valley, Pa., assignor to Honeywell Inc., a corporation of Delaware
Filed Feb. 21, 1963, Ser. No. 260,173
3 Claims. (Cl. 73—37.6)

This invention relates to measuring apparatus, and more particularly to liquid level sensing and control means.

In certain industrial processes, it is necessary to maintain the level of a liquid in a container at a substantially constant level, notwithstanding the fact that liquid is removed from such a container from time-to-time in the operation of the process. In some of these processes, because of the composition of the liquid or the temperature thereof, the liquid is very corrosive to probes that are introduced into the liquid as a means of determining the level thereof. Such corrosion leads to expensive, frequent replacement of sensing probes as well as to inaccuracies and unreliabilities of the measurement.

It is, accordingly, an object of the present invention to provide an improved liquid level sensing means which obviates the foregoing difficulties.

It is another object of the present invention to provide an improved liquid level sensing means featuring a sensing probe which does not physically contact the liquid.

It is a further object of the present invention to provide an improved liquid level sensing means as set forth which provides an accurate, continuous indication of the level of the liquid within an allowable range, which range is of substantial width.

In accomplishing these and other objects, there has been provided, in accordance with the present invention, a liquid level sensing and indicating means which is particularly suited for use with viscous fluids such as molten glass. A sensing probe includes a tubular body having a concentric array of longitudinal channels. An air stream under pressure is emitted from one or more of the channels toward the surface of the liquid. As the emitted air impinges on the surface of the liquid, a portion of the air stream is reflected back to the open end of the other or detecting channel of the probe, causing a pressure condition to be established within that channel which is a function of the distance of the end of the probe from the surface of the liquid. The pressure in the detecting channel is compared with an ambient pressure and the resultant is used to actuate a relay controlled servo mechanism whereby the position of the probe is adjusted to follow the changes in the liquid level with the end of the probe always a predetermined distance above the level of the liquid. Means are then provided for detecting the position of the probe, relative to a fixed reference, as a representation of the level of the liquid in the container. Signals obtained thereby may be used to actuate an indicator, to control the influx of material into the container to maintain the liquid level at a desired value, or both.

A better understanding of this invention may be had from the following detailed description when read in connection with the accompanying drawing in which:

FIG. 1 is a schematic representation, partly in cross-section, of a system embodying the present invention, FIG. 2 is a perspective view, in phantom and on an enlarged scale, of a fragment of the probe illustrated in FIG. 1, FIG. 3 is an end view of the probe, and, FIG. 4 is a schematic representation, partly in cross-section, of somewhat different structure but also embodying the present invention.

Referring now to the drawings in more detail, there is shown in FIG. 1 a structure for measuring and indicating the level of a liquid 2, such as molten glass, in a container such as a glass melting tank, fragmentarily represented by a tank bottom 4 and a tank top 6. Extending through an opening 8 in the tank top 6 is a probe body 10. The probe body 10 may be made of any suitable material. For example, when the material in the container is molten glass, the probe body 10 may be made of a suitable porcelain material capable of withstanding the high temperatures involved. In the case of other materials in the container where the temperature is not so extreme, the probe body 10 may be made of a suitable metal.

Longitudinally of the probe body 10 there are provided a plurality of passages or channels. In the illustrated form of the invention shown in FIGS. 1 to 3, there is a central passage 12 having a lower portion 14 of an enlarged diameter relative to the remainder of the passage. That passage 12 is, as will be more fully described hereinafter, the sensing or receiving passage. Surrounding the central passage, there is an array of three transmitting passages or channels 16. These latter passages are substantially equally positioned about the central axis of the probe. A further channel or passage 18 constitutes a reference passage for sensing or sampling the ambient pressure condition for reference purposes, as will be more fully described later. The reference passage 18 does not extend all the way to the end of the probe body 10 but, instead, is open, through a side port 20, to the side of probe body 10.

The upper end of the probe body 10 is mechanically connected, as by a rod 22, to a servo driver. In the illustrated embodiment, this servo driver is shown as a pneumatic positioning motor 24. The motor 24 includes an outer case 26 sealed to a relatively fixed base member 28. Within the chamber defined by the case 26 is a bellows member 30 which is also sealed to the base member 28 at its lower end. The rod 22 extends through a central opening in the base member 28 and is mechanically secured to and sealed in the upper end of the bellows member 30. A bias spring 32 surrounds the rod 22 and is mounted in compression between the upper end of the bellows member 30 and the upper surface of the base member 28. The outer case 26 is provided with a fitting 34 for connection to a source of controlled air pressure.

Mounted on top of the case member 26 is a position detector 36. The position detector 36 may, as shown, take the form of a linear differential transformer having a movable core 38 mounted to be moved in accordance with the movement of the rod 22. As shown, the core member 38 is secured to an extension of the rod 22 and is arranged for vertical movement in a sealed extension of the motor chamber. The output signal of the differential transformer 36 may be applied as input signal to an indicating instrument 40.

As was previously mentioned the probe body 10 is provided with a plurality of longitudinally extending passages. Each of these passages is open at its lower end, whether directly out the end of the probe, as in the case of the transmitting and receiving probes, or out the side of the probe body, as in the case of the reference passage. Each of these passages is provided, at its upper end with a fitting. Thus, the transmitting passages are provided with a fitting 42. It should be noted that the several transmitting passages are interconnected either by interconnecting transverse channels within the probe body 10, itself, or by some form of an external manifold. The fitting 42 is connected to a length of flexible tubing 44 which is, in turn, connected to a filtered air supply line 46.

The receiving passage 12 is provided with a fitting 48. A length of flexible tubing 50 is connected between the fitting 48 and a first pressure responsive cell or capsule 52. The reference passage 18 is provided with a fitting 54. A length of flexible tubing 56 is connected between the fitting 54 and a second pressure responsive cell or capsule 58. The pressure responsive capsules 52 and 58 are mechanically interconnected and, together, constitute a differential pressure detecting means. The interconnecting means between the two pressure detecting cells 52 and 58 is illustrated as a rigid rod 60. A pneumatic control flapper 62 is secured to the rod 60 for movement therewith. Positioned for cooperative association with the flapper 62 is a pneumatic control nozzle 64. A filtered air supply line 66 is connected through a pneumatic restriction 68 to the nozzle 64 and to a pneumatic relay 70. Air under pressure is supplied to the pneumatic relay 70 from the supply line 66 by a feed line 72. The controlled output of the pneumatic relay 70 is connected by means of a feed line 74 to the fitting 34 on the pneumatic positioning motor 24.

In operation, air under uniform pressure is supplied through the line 46, flexible coupling 44 and the fitting 42 to the transmitting channel 16 on the probe body 10. The stream of air issuing from the open end of the passages 16 impinges on the surface of the liquid 2, causing a deformation of the surface, substantially as shown in FIG. 1. The air streams impinging upon the surface of the liquid 2 are at least partially reflected back toward the lower end of probe 10. The reflected air produces a pressure within the receiving channel 12 which is a function of the flow rate issuing from the transmitting channel 16 and the proximity of the probe end to the surface of the liquid. If the flow rate is being maintained constant, then the pressure within the receiving channel 12 is a function only of the proximity to the surface of the liquid 2. The resulting pressure in the receiving channel 12 is applied through the flexible tubing 50 to the pressure detecting capsule 52. The ambient pressure within the container is sensed by the reference passage 18 through the lateral port 20. This pressure is applied through the flexible tubing 56 to the pressure detecting capsule 58. The difference in pressure applied to these two capsules 52 and 58 cause the interconnecting link 60, and hence the flapper 62 to assume a position which is a function of the aforementioned difference in pressure. The position of the flapper 62 relative to the nozzle 64 causes a corresponding pressure condition to be developed in the nozzle 64, hence, applied as input control signal to the pneumatic relay 70. The pneumatic relay 70 is conventional in form and constitutes a control member for controlling the amount of fluid passed from the feed line 72 to the output line 74 as a function of the control signal applied from the nozzle 64. Thus, the air admitted to the motor 24 between the outer case 26 and the bellows 30 is a function of the differential pressure detected by the capsules 52 and 58, hence, of the relative position of the end of the probe with respect to the surface of the liquid 2. The bias spring 32 supports the weight of the probe and normally biases the probe into its uppermost position. In this condition, a minimum pressure is detected by the receiving channel 12 in the probe. Accordingly, a minimum pressure is applied to the detecting capsule 52. That, in turn, causes the flapper 62 to be in its closest position relative to the nozzle 64, thereby causing a maximum pressure to be built up within the nozzle 64 and applied as input signal to the pneumatic relay 70. The large input signal to the pneumatic relay causes the relay 70 to be opened, applying a controlled pressure to the feed line 74. As the pressure builds up within the motor 24, the bellows member 30 is caused to compress. This causes the probe 10 to be moved downward toward the surface of the liquid, against the force of the bias spring 32. As the probe 10 descends towards the surface of the liquid 2, the air stream emitted from the transmitting passage 16 is reflected from the surface of the liquid 2 causing a progressively increasing pressure to build-up within the detecting passage 12. The increasing pressure in the passage 12 is applied to the pressure detecting capsule 52. The increase in pressure on the capsule 52 relative to that applied to capsule 58 causes the flapper 62 to be moved slightly away from the nozzle 64 progressively as the pressure in the passage 12 builds-up. This, in turn, produces a progressively decreasing pressure as the input signal to the pneumatic relay 70. The reduced input signal to the pneumatic relay 70 causes a reduced rate of flow of air to the motor 24. This progression continues until at some predetermined and preselected position of the end of the probe 10 and the surface of the liquid 2, a condition of equilibrium is established. The position of equilibrium may for example, be such that the lower end of the probe 10 is on the order of one-half inch above the level of the liquid 2. Since the equilibrium is established as a predetermined distance between the lower end of the probe 10 and the upper surface of the liquid 2, as the level of the liquid changes, that equilibrium tends to be disrupted so far as the various pressure elements of the system are concerned. However, that disruption in the equilibrium results in the change in the air supplied to the motor 24 in such a way that the probe 10 will follow the changes in the liquid level, thus reestablishing the equilibrium at whatever the new level is. In actual practice, the probe smoothly follows whatever changes appear in the level of the liquid 2. Thus, at any instant the position of the probe relative to the fixed portion of the motor 24 is directly related to the level of the liquid 2 in the container or tank.

As was previously mentioned, the relative position of the probe is detected by the position detector 36 represented in this illustrative embodiment as a differential transformer. The output signal from the differential transformer is directly proportional to the relative position of the core member 38. Since the core member 38 is directly mechanically connected to the probe 10, the position of the core 38 changes with the position of the probe 10. Therefore, the output signal of the detector or transformer 36 is directly proportional to the position of the probe 10. The signal thus produced may then be applied to any suitable utilization device, such devices being well known in the art. In the illustrative embodiment, the utilization device is represented as an indicating instrument 40. It will be appreciated, of course, that many other types of utilization devices may be connected to make use of the output signals from the detector 36, such, for example, as various indicating and/or recording devices as well as controlling devices for controlling the addition of materials to the container to bring the level of the liquid up to the desired level.

The structure shown in FIG. 4, embodying the present invention, is substantially identical to that shown in FIG. 1 with the exception of the structure of the probe body, itself. The probe body 80 is, again, a substantially cylindrical body made of a suitable material such as ceramic or of a suitable metal, as the case may be. Again, the probe body is provided with a concentric array of passages or channels. In this case there are two channels provided, one of which is co-axial with respect to the other. Thus, the central or inner passage is defined by a tubular member 82 supported centrally of and co-axially with the outer passage 84 within the probe body 80. The upper end of the tubular member 82, hence of the inner passage way, is provided with a fitting 86. A length of flexible tubing 88 is connected between the fitting 86 and an air supply line 46, as in the structure shown in FIG. 1. The upper end of the outer passage or channel 84 is provided with a fitting 90. A length of flexible tubing 92 is connected between the fitting 90 and the pressure responsive capsule 52. A length of pipe or tubing 94 extends through the top 6 of the tank or container and is connected at its opposite end to the second pressure responsive capsule 58. This latter connection affords a means of applying the ambient pressure within the container as a reference pressure for the capsule 58.

In the structure shown in FIG. 4, the central or inner passage or channel constitutes the transmitting passage. As before, air supplied from the line 46 through the flexible tubing member 88 and the fitting 86 to the central passage 82 issues from the end of the probe 80 toward the surface of the liquid 2. Here again, the air issues in a stream from the end of the probe 80, impinges upon the surface of the liquid 2, deforming the surface thereof, and is reflected, at least in part, back toward the end of the probe 80. When the end of the probe is sufficiently close to the surface of the liquid, the reflected air stream again produces an increase in pressure in the receiving passage way in the probe 80 which, in this instance, is the outer passage 84. The build-up of the pressure in the passage 84 is transmitted through the flexible tubing 92 to the pressure responsive capsule 52. There the pressure is compared with the reference pressure applied to the capsule 58. From this point on, the system and the operation are identical to that described in connection with the system illustrated in FIG. 1. The differential pressure on the two capsules 52 and 58 position the flapper 62 in juxtaposition to the nozzle 64 thereby controlling the operation of the pneumatic relay 70. The pneumatic relay 70 controls the flow of air from the supply line 66 through the supply line 72 into the lead line 74, thence, into the pneumatic positioning motor 24. As before, a stable position of equilibrium is achieved whereby the end of the probe maintains a position at a fixed distance above the surface of the liquid 2. This positioning of the probe 80 produces a corresponding positioning of the core 38 in the position detector differential transformer 36. The output signal of the differential transformer 36 is representative of the position of the probe, hence, of the level of the liquid in the container. That signal is again supplied to a suitable utilization device, here represented as an indicating meter 40.

While in both illustrated embodiments of the invention, the differential pressure detector and the positioning servo driver are both shown as being pneumatic instrumentalities, it should be abundantly apparent that either or both of these elements might be in the form of electrically actuated components without departing from the spirit and scope of the present invention. In either case, it may be seen that the probe will accurately follow the level of the liquid in the tank producing a continuous output indication of that level, and is capable of following that level over a relatively wide range of level changes. In one constructed embodiment of this invention the range of level differences covered was upwards of two inches, and exhibited a sensitivity of about one one-hundredth of an inch.

Thus, there has been provided a liquid level sensing means which does not physically contact the liquid, and which gives a continuous, accurate, and reliable indication of the liquid level over a relatively wide range of changes in level.

What is claimed is:

1. Liquid level sensing means comprising an elongated probe member having therein a concentric array of longitudinal passages, a central one of said passages comprising a receiving passage and a plurality of passages in spaced array about said receiving passage comprising a plurality of transmitting passages, said transmitting passages and said receiving passage being open to one end of said probe, means connected to said transmitting passages for producing a uniform stream of air issuing from said open end of said transmitting passage toward the surface of said liquid, said receiving passage being responsive to a portion of said stream of air reflected from said surface to produce a pressure within said receiving passage proportional to the proximity of said probe end to said surface of said liquid, servo motor means connected to said probe for positioning said probe relative to the surface of said liquid, pressure responsive means coupled to said receiving passage for producing a control signal representative of the pressure produced in said receiving passage, means responsive to said control signal for controlling the operation of said servo motor means to position said probe at a position of equilibrium a predetermined distance above the surface of said liquid, and position detector means connected to said probe to produce an output signal representative of the position of said probe, therefore, of the level of the surface of said liquid.

2. The invention as set forth in claim 1 characterized by the addition of a further passage extending longitudinally of said probe, said further passage being open to the side of said probe near said one end of said probe and comprising means for sampling the ambient pressure near said probe end, said pressure responsive means comprising a differential pressure responsive means connected for comparing said pressure in said receiving passage with said sampled ambient pressure.

3. Liquid level sensing means comprising an elongated probe member having a centrally located longitudinal receiving passage therethrough, said probe member further having three transmitting passages arranged in equally spaced array about said centrally located receiving passage, said transmitting passages also extending longitudinally through said probe member, said transmitting passages and said receiving passage being open to one end of said probe member, means for connecting a source of air to said transmitting passages to produce a uniform stream of air issuing from said open end toward the surface of the liquid, said receiving passage being responsive to a portion of said stream of air reflected from said surface to produce a pressure within said receiving passage proportional to the proximity of said probe end to said surface of said liquid, a pneumatic servo motor means connected to said probe for selectively positioning said probe relative to said surface of said liquid, said probe including a further longitudinal sampling passage, said sampling passage being open to a side of said probe near said one end thereof, said sampling passage comprising means for sampling the ambient pressure in the vicinity of said surface of said liquid, first pressure responsive means connected to said receiving passage, second pressure responsive means connected to said sampling passage, said first and second pressure responsive means being differentially interconnected to provide a pressure differential control signal, pneumatic control means responsive to said control signal connected to control the operation of said pneumatic servo motor in accordance with said control signal to position said probe at a position of equilibrium predetermined distance above said surface of said liquid, and an electromagnetic position detector connected to said probe for producing an output signal representative of the position of said probe, therefore of the level of said liquid.

References Cited by the Examiner

UNITED STATES PATENTS

| 2,398,958 | 4/46 | Pellettere | 73—290 X |
| 2,589,251 | 3/52 | Heinz | 73—37.5 |
| 2,692,498 | 10/54 | Knobel | 73—37.5 |
| 2,737,807 | 3/56 | Brichard | 73—290 |
| 2,876,551 | 3/59 | Bowlby | 33—147 |
| 2,982,124 | 5/61 | Knobel | 73—37.7 |
| 2,986,924 | 6/61 | Becker | 73—290 X |

FOREIGN PATENTS 879,466   6/53   Germany.

ISAAC LISANN, *Primary Examiner.*